Sept. 22, 1936.   T. D. HOWE, JR   2,055,234
METHOD OF CHARTING AND CUTTING MATERIAL
Filed Dec. 9, 1933   2 Sheets-Sheet 1
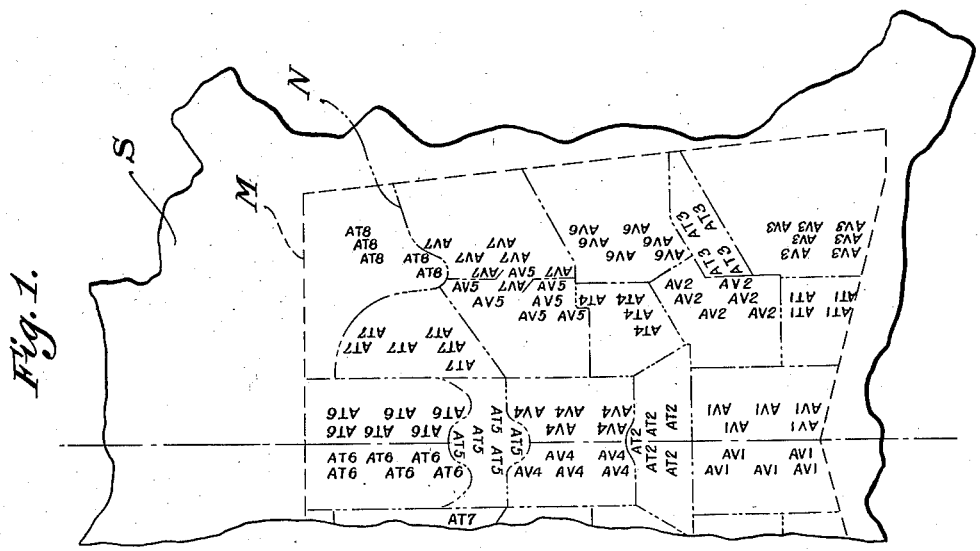
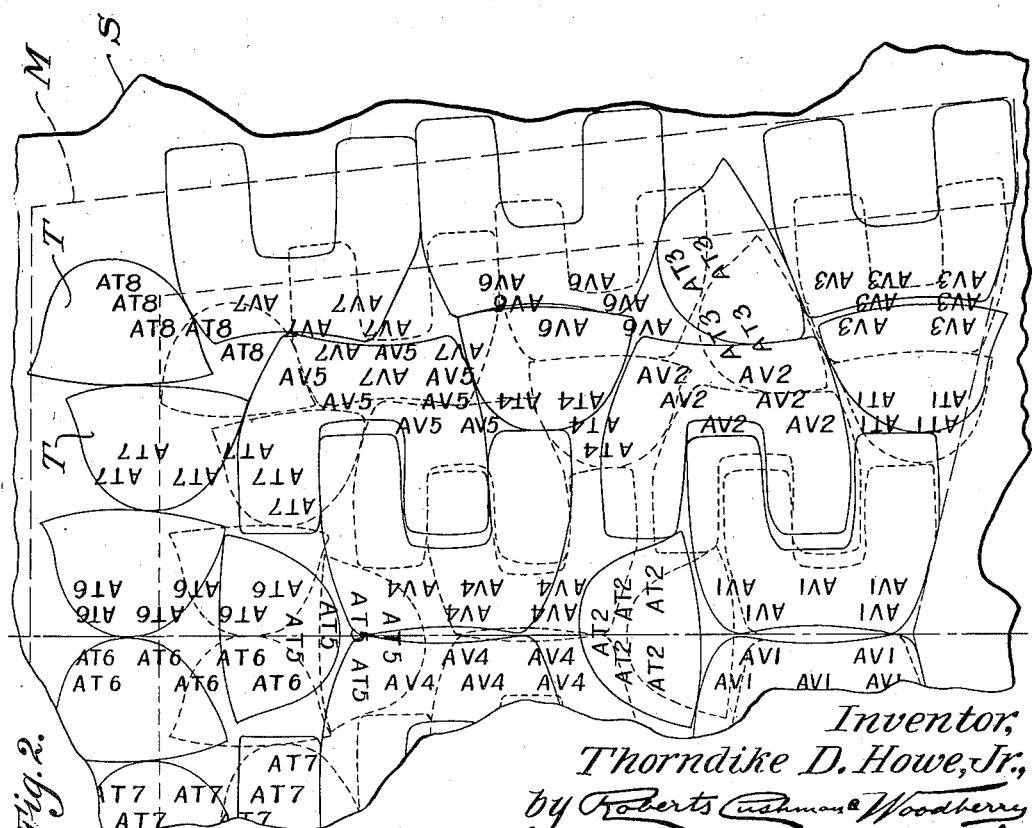
Inventor,
Thorndike D. Howe, Jr.,
by Roberts Cushman & Woodberry
Attys.

Sept. 22, 1936.    T. D. HOWE, JR    2,055,234
METHOD OF CHARTING AND CUTTING MATERIAL
Filed Dec. 9, 1933    2 Sheets-Sheet 2
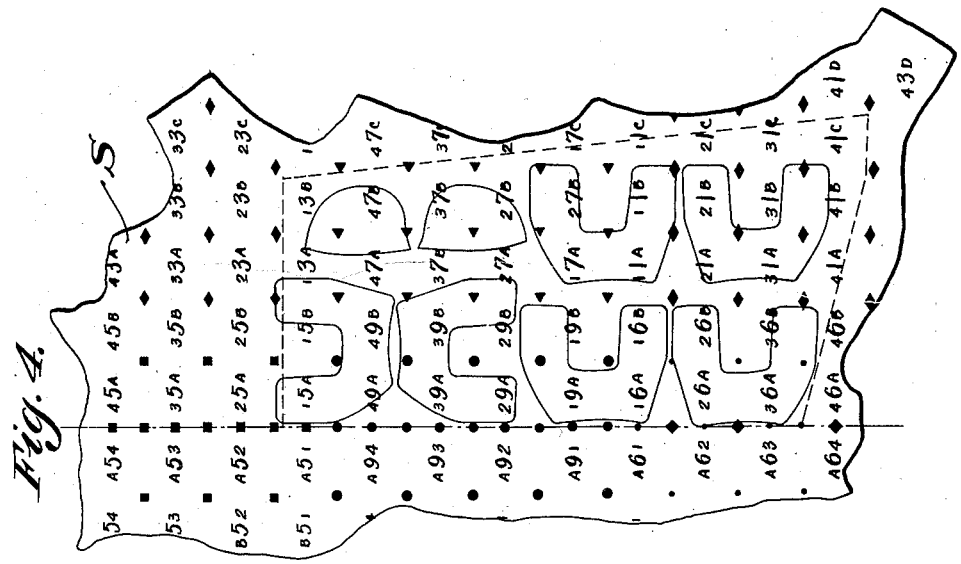
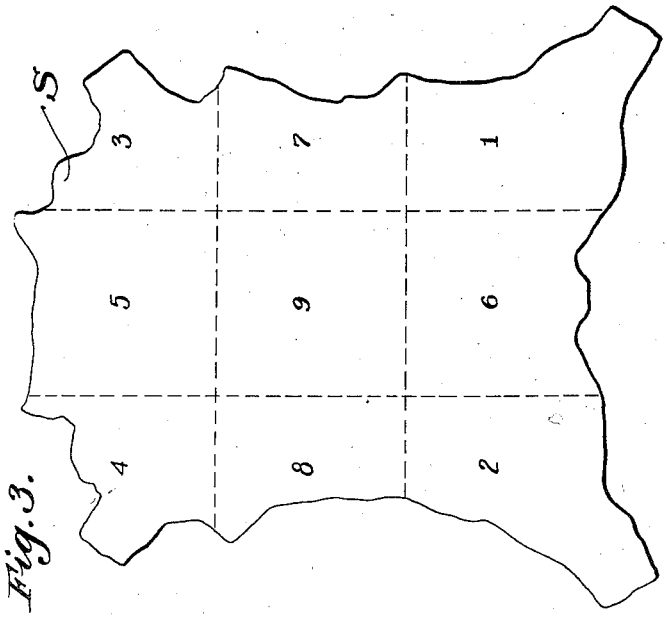
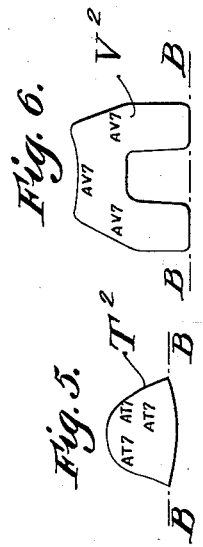
Inventor;
Thorndike D. Howe, Jr.
by Roberts Cushman Woodbury
Attys.

Patented Sept. 22, 1936

2,055,234

UNITED STATES PATENT OFFICE 2,055,234

METHOD OF CHARTING AND CUTTING MATERIAL

Thorndike D. Howe, Jr., Boston, Mass., assignor to Solescope, Incorporated, Boston, Mass., a corporation of Massachusetts Application December 9, 1933, Serial No. 701,657

5 Claims. (Cl. 33—6)

This invention relates to an improved method of charting and cutting material which is supplied in pieces of variable superficial area and irregular contour, so as to produce as large a number of parts of predetermined sizes and shapes as possible with a minimum amount of waste, the invention being particularly applicable to the cutting of shoe parts from leather.

To facilitate the economical cutting of upper leather into shoe parts, certain systems have been worked out and so charted that even a relatively unskilled cutter, by reference to the charted directions, may cut up a given piece of leather in an economical way and in a minimum period of time. Usually the direction charts are so devised that two or more kinds of shoe parts, for example, vamps and tips, may be cut from the same piece of leather, as this facilitates cutting without undue waste. A series of charts may be provided for cutting different patterns, styles, or combinations of shoe parts, and for convenience the different charts may be given designating index characters.

Since leather varies greatly in quality at different parts of a skin or hide, for example that at the center of the back is much firmer, of more uniform thickness and less liable to stretch than that in the neck, flanks, or legs, it becomes necessary to assort the pieces after cutting so that, for instance, parts of like grade may be used in making up a given pair of shoes, or so that the parts of poorer quality may be reserved for one grade of shoe, and those of better quality for a higher grade. To facilitate such grading of the cut pieces, there has been devised a system of marking the leather, before cutting, so that after cutting each piece shall bear a number or other index character showing at a glance from what part of the hide or skin it was cut. In accordance with one method of marking, nine major portions of the skin are distinguished in thus grading for quality, to wit, the head, the two fore-legs, the two hind-legs, the two flanks, the butt, and the center, and in accordance with one at least of such systems of grade marking, each of these major sections or areas is further subdivided into lesser portions, and to each such lesser portion is assigned a distinct designating character or number. This character or number is then printed or otherwise applied to the skin, usually at the back, with so many repeats of a given character distributed over its assigned portion or area of the skin that any shoe part cut from such portion is substantially certain to include one or more repeats of this character or index.

By the proper use of such a charting system, coupled with the grade marking just described, it should be possible substantially to standardize the cutting of shoe parts with assurance of most economical cutting, but it has been found in practice that careless operators frequently fail to follow the charted directions or to select the proper chart from which to get the directions, with resultant waste of material. Moreover, when several cutters are at work it becomes very difficult, if not impossible, to determine which cutter is responsible for this uneconomical work.

In accordance with the present invention, I have devised a method of charting and cutting material so that after cutting, each piece shall itself bear an index character not only showing the part of the skin or hide from which it has been cut, but also showing whether the particular part has been cut in accordance with the charted directions. Thus not only is the grading of the parts properly provided for, but there is also provided a check upon the work of the cutter, so that any carelessness or inefficiency on the part of the latter may be noted immediately and proper steps taken to remedy the situation. Preferably, in accordance with this invention, each part, after cutting, bears a combined index character showing not only the part of the skin from which the piece was cut, but also the particular chart employed in laying out the work and the type of shoe part which has been cut, while the arrangement of this combined index on the part, and in particular its position with reference to the base line or other selected feature of the part, shows whether the selected chart has properly been followed in cutting the part.

In the accompanying drawings I have illustrated one embodiment of the invention by way of example, but while in the instance selected I have specifically shown the use of a chart marked for cutting a combination of vamps and tips, it is to be understood that the basic principle of the invention is applicable to such other chart combinations as may be found desirable.

In the drawings:

Fig. 1 is a fragmentary rear view of a hide or skin showing the central portion of the same as provided with repeats of index characteristics arranged substantially in accordance with the present invention and following one system of charting;

Fig. 2 is a fragmentary view similar to Fig. 1, but to larger scale, and indicating in outline the arrangement of a combination of shoe parts disposed in accordance with one method of chart- 2,055,234 ing, and also illustrating the present improved indexing system;

Fig. 3 is a plan view illustrating the nine major commonly recognized divisions of a whole hide or skin;

Fig. 4 is a fragmentary plan view of a portion of a hide or skin showing how a careless or inefficient operator may, by failure to follow directions, produce a substantially lesser number of shoe parts than he should from a given area of hide; and Figs. 5 and 6 are plan views, to small scale, illustrating shoe parts cut in accordance with the present improved method of charting and cutting.

Referring to the drawings, the character S indicates a hide or skin of the kind used in cutting the parts making up a shoe upper. Such a hide is not of uniform thickness, firmness, or strength and is of irregular outline, and the trade recognizes nine specific portions of such a hide in grading for quality. Thus in Fig. 3 the hide is shown as divided by broken lines into nine sections, to wit: the head and neck section, marked 5; the two fore-leg sections, marked 3 and 4; the two flank sections, marked 7 and 8; the center section, marked 9; the two rear legs, marked 1 and 2; and the butt section, marked 6.

After shoe parts have been cut from the hide, it is desirable to assort them into grades according to the parts of the hide from which they were cut, and in accordance with one system of grading, the rear surface of the hide is provided with indicia, for example, numbers distributed rather closely over each individual section, such numbers corresponding to the number of the given section, so that whenever a part is cut, for example from the center section 9, it will bear upon its rear surface the number 9, thus indicating to the assorter that this particular part was cut from the center section.

Since the hide is of irregular contour and since the shoe parts are of such shape that they cannot easily be closely juxtaposed, it requires a great deal of skill on the part of the operator, unless assisted, to cut the maximum possible number of shoe parts from a given hide. This difficulty has led to the preparation of standardized charts in which various possible arrangements of shoe parts, particularly combinations of different shoe parts, have been experimentally laid out so that by following a proper chart, adapted, for example, to the size of the hide and the style and/or sizes of shoe parts to be cut, the operator may, without any particular skill, cut from a given hide the maximum number of parts.

While prior methods of cutting are useful and should result in economy in cutting and assorting, if properly followed, they are still open to the objection that a careless cutter may fail to follow the charted directions. Thus, for example, as shown in Fig. 4, an operator may proceed, without reference to the charted outline with which he has been provided to cut a series of vamps and tips which are substantially less in number than the maximum which ing and assorting purposes some symbol indicating the area of the hide from which the part was cut must be retained.

As indicated in Fig. 2, this system of marking permits considerable elasticity in the cutting operations, for example, the cutting of shoe parts of a substantially wide range of sizes in accordance with a given chart and from the same piece of material without sacrifice of the advantages accruing from the present invention. In this figure the maximum size of part is shown in full lines and the minimum size in dotted lines, and it will be noted that whether the part be of maximum or minimum size it will bear one or more repeats of the proper index characteristic always disposed in upright position as respects the base line of the cut part.

It is obvious that any desired symbols may be used for showing the different areas of the skin and that other divisions of the skin may be used if desired than those herein particularly referred to. It is also to be understood that instead of employing numbers or letters for indicating the different parts, other characteristics such as colors, or geometric or other figures may be employed, and that a greater or lesser number of repeats of the proper symbol or character may be applied to a given area of the skin or hide than herein specifically illustrated.

I claim:

1. That method of preparing shoe parts from a hide or skin which comprises as steps preparing a chart showing a combination of parts which may be cut without substantial waste from a selected area of the hide or skin and whereon the various parts are disposed in different angular relation to each other and to the length of the hide or skin, applying to the skin or hide, at the charted location of each such part, a symbol so related to the charted position of such part that, if the part be properly cut in accordance with the chart, said symbol will occupy a predetermined recognizable relation to the part, cutting the skin or hide into parts, and assorting the cut parts to segregate those having their designating symbols in such predetermined recognizable relation to the parts.

2. That method of preparing shoe parts from a hide or skin which comprises as steps preparing a chart showing a combination of parts which may be cut without substantial waste from a selected area of the skin and whereon the various parts are disposed in different angular relation to each other and to the length of the hide or skin, and so applying to the hide or skin, at the charted locations of each such part, an index character so arranged that, after the skin has been cut into parts, such an index character will appear in upright position upon each part if the latter has been properly cut, cutting the skin or hide into parts and assorting the cut parts and noting those on which the index character is not in upright position.

3. That method of preparing shoe parts from a skin or hide which comprises as steps preparing a chart showing a combinative arrangement of parts which may be cut to advantage from the hide or skin without substantial waste and wherein the outlines of the various parts are arranged with their base lines at different angles relatively to the length of the hide, assigning to certain specified areas of the leather distinguishing index characteristics, applying repeats of the assigned index characteristic to each of said areas in such distribution that any shoe part cut from such an area will bear one or more of such index characteristics, and, in so applying the index characteristics, arranging them with reference to the charting of the hide so that when a piece is properly cut, according to such charting, its index characteristic will be in upright position relatively to the base line of the piece cutting the skin or hide into shoe parts, and assorting said cut parts to segregate those having their symbols disposed in upright position.

4. That method of preparing shoe parts from skins or hides which comprises as steps preparing a series of charts, each showing a combination of shoe parts which may be cut to advantage from the skin or hide without substantial waste, assigning to each chart a designating character, assigning to different shoe parts which are to be cut distinguishing characters, assigning different distinguishing characters to different major sections of the hide or skin containing leather of different qualities, respectively, and applying to each of such major sections of the hide or skin repeats of a combined index comprising the selected chart designating character, the section designating character, and a shoe part designating character, such combined index repeats being so arranged that any shoe part properly cut according to the chosen charting will bear said combined index in upright relation to the base line of such part, cutting the skin or hide into shoe parts, and assorting the cut parts by reference to the symbols thereon to segregate those parts having their symbols disposed in upright position.

5. That method of preparing shoe parts from a hide or skin which comprises as steps preparing a chart showing a combination of parts which may be cut without substantial waste from a selected area of the hide or skin, applying to the hide or skin, at the charted location of each such part, a symbol so related to the charted position of such part that the symbol occupies a predetermined recognizable relation to a chosen contour line of said part, thereafter cutting the parts from the hide or skin in accordance with the chart, and assorting the cut parts by reference to the symbols thereon to segregate those parts having their symbols properly positioned.

THORNDIKE D. HOWE, Jr.